United States Patent Office 3,502,211
Patented Mar. 24, 1970

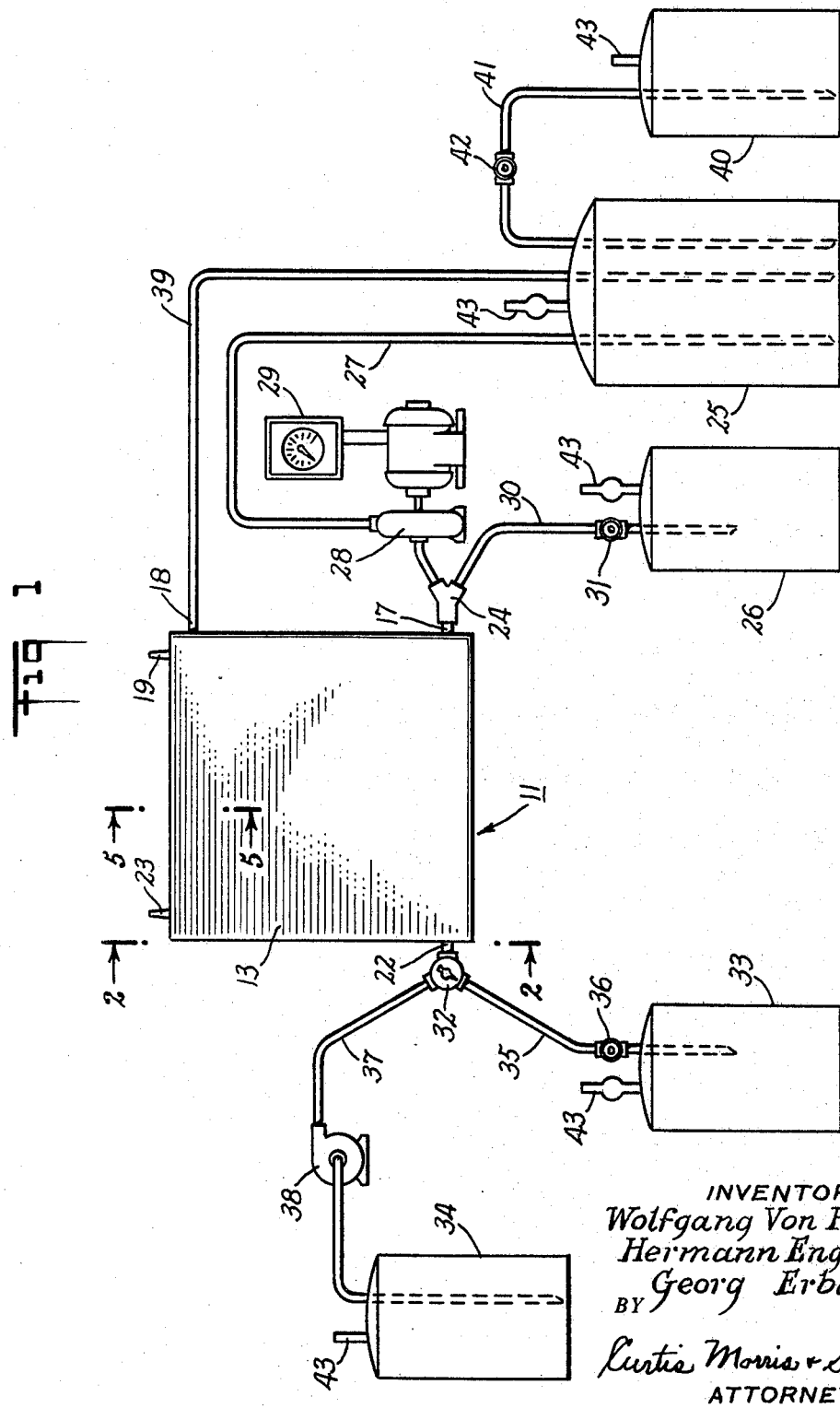

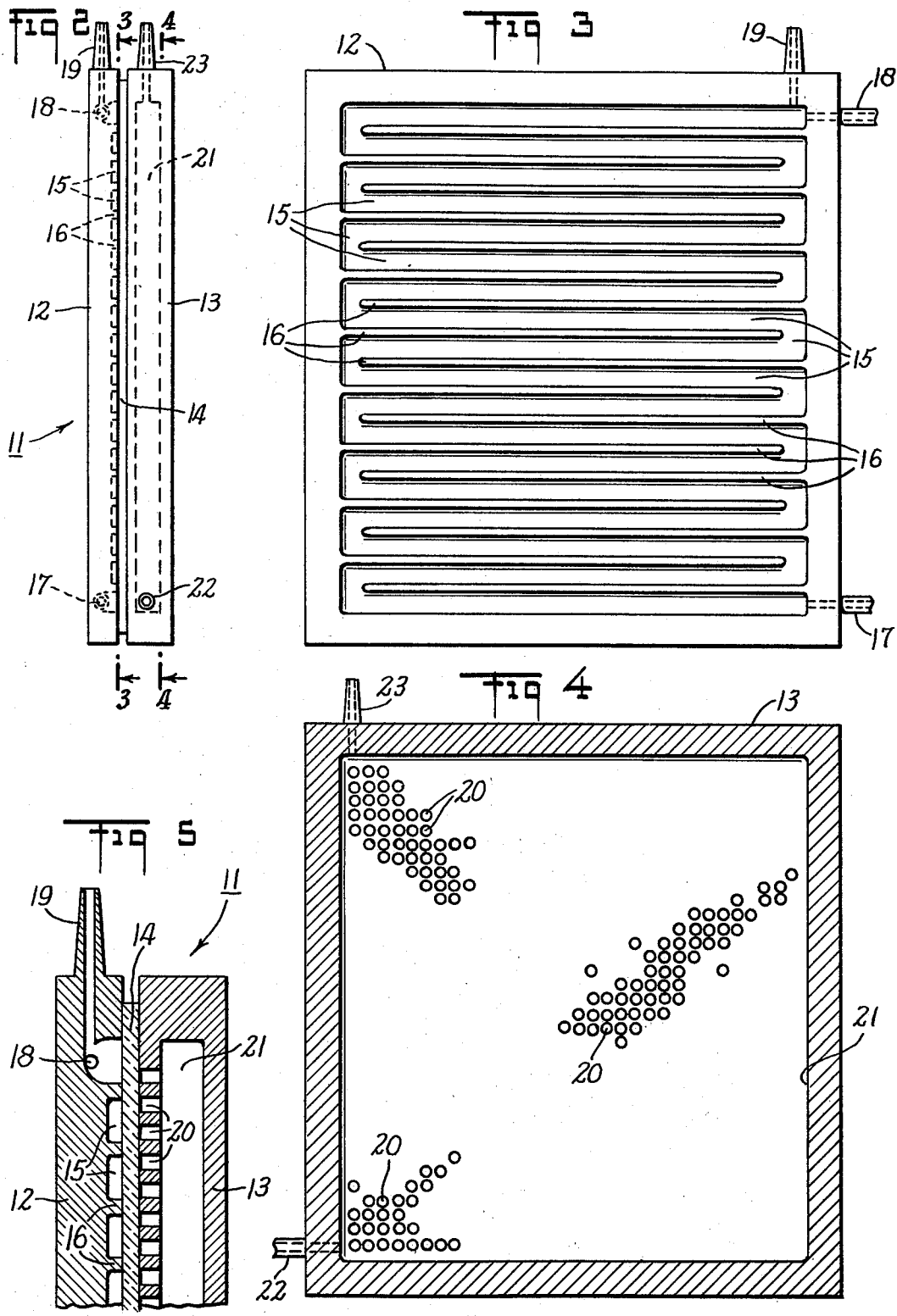

3,502,211
PROCESS AND APPARATUS FOR RECOVERING SOLIDS IN ENRICHED AND PURIFIED FORM
Wolfgang von Pölnitz, Frankfurt am Main, and Hermann Engelhardt and Georg Erbach, Marburg an der Lahn, Germany, assignors to Farbwerke Hoechst Aktiengesellschaft vormals Meister Lucius & Bruning, Frankfurt am Main-Hoechst, Germany, a company of Germany
Continuation-in-part of application Ser. No. 91,390, Feb. 24, 1961. This application Nov. 1, 1965, Ser. No. 505,725
Claims priority, application Germany, Feb. 25, 1960, B 56,813
Int. Cl. B01d 23/24
U.S. Cl. 210—79                 3 Claims

ABSTRACT OF THE DISCLOSURE

Method and apparatus for filtering suspensions by passage thereof through a single continuous sinuous channel in contact with a filter, wherein the suspension is continuously recycled through the channel and wherein the direction of flow of the suspension within the channel is periodically reversed.

---

This application is a continuation-in-part of Ser. No. 91,390, filed Feb. 24, 1961, now abandoned.

This invention relates to a method for enriching and purifying the solids contained in very dilute suspensions and to apparatus for performing the same.

Heretofore, filtration and centrifugation have been used for separating solids from the liquid phase of a suspension. However, with either of these methods the quantity of solids which can be separated in a single operation is very limited. Filtration has the disadvantage that the particles retained on the filter rapidly clog the pores of the filter so that filtration is slowed and finally stopped. It is not possible to wash the filtered solids on the filter, nor can the solids be redissolved in a suction funnel. Rather, the solid residue must first be transferred to a flask or other container, which entails considerable losses.

Centrifugation, on the other hand, has the disadvantage that solid substances the specific gravities of which are almost the same, for example proteins, cannot be completely separated from each other. Also, it is often impossible to dissolve the centrifuged solid sediment, and washing it in most cases involves heavy losses. Moreover, centrifugation requires the expenditure of considerable work and energy. Since it cannot be carried out in a closed system, the risk of contamination, e.g. by bacteria, is involved. If the centrifuged solids become contaminated, it is necessary to subject them, especially biological material, to additional Seitz filtrations which also entail great losses. Further, centrifuges are very costly. In consequence of these numerous disadvantages, centrifugation in a refining process considerably increases the cost of the final product.

The present invention relates to a method, free of these disadvantages, for recovering suspended solids in an enriched and purified form, particularly bacteria and protein containing precipitates, and to an apparatus adaptable to use in that method.

A better understanding of the invention will be had by reference to the accompanying drawings, in which:

FIG. 1 is a view of a filter apparatus according to the invention;

FIG. 2 is a side elevation, in section along lines 2—2 of FIGURE 1, of a filter assembly comprising a front element and a rear element;

FIG. 3 is a front elevation, in section along lines 3—3 of FIGURE 2, showing details of the front element of the filter assembly;

FIG. 4 is a front elevation, in section along lines 4—4 of FIGURE 2, showing details of the rear element of the filter assembly; and FIG. 5 is an enlarged side elevation, in section along lines 5—5 of FIGURE 2, showing details of the filter assembly.

Filter assembly 11 of FIG. 1 is shown in FIGS. 2-5 to comprise two elements, identified in the figures as front element 12 and rear element 13, separated by filter 14, which is impermeable to solids.

As shown in particular detail in FIGURES 3 and 5, one face of front element 12 is fashioned to form a plurality of interconnecting subchambers 15, each suitably about two centrimeters wide, by dividers 16 extending alternately from opposite side walls of front element 12 so as to define a long meandering fluid path between inlet means 17 and outlet means 18 communicating with said subchambers 15. Subchambers 15 are also in communication with pressure equalizing vent 19.

As shown in FIGURES 2 and 5, filter 14 is supported by rear filter assembly element 13, which is provided with a plurality of perforations 20 in that face thereof which is in contact with filter 14. Perforations 20 are in communicattion with interior collecting chamber 21 in rear element 13. Collecting chamber 21 is provided with outlet means 22 and pressure equalizing vent 23, as shown in FIGURE 4.

Filter 14, separating front filter assembly element 12 and rear filter assembly element 13 is a coherent filter impermeable to solids, for example a Seitz filter EK, a membrane filter, or a hard filter.

Referring now to FIGURE 1, front element 12 of filter assembly 11, i.e. subchambers 15 therein, are in communication through inlet means 17 and Y connector 24 with storage container 25 and container 26. Line 27 interconnecting inlet means 17 and storage container 25 contains pump 28, suitably a reversible rotary pump equipped with automatic timing device 29. Line 30 interconnecting inlet means 17 with container 26 is provided with stopcock 31.

Outlet means 22 of rear element 13 of filter assembly 11 are connected through three-way stopcock 32 with filtrate collection container 33 and container 34. Line 35, through which filtrate collection container 33 and interior collecting chamber 21 of rear filter element 13 are in communication, is provided with stopcock 36. Line 37, through which interior collecting chamber 21 and container 34 are in communication, is provided with pump means 38.

Completing the description of FIGURE 1, outlet means 18 of front filter element 12, particularly subchambers 15 thereof, are in communication with storage container 25 through line 39. Similarly, storage container 25 is in communication with further container 40 through line 41 provided with stopcock 42. Storage container 25, filtrate collection container 33, and containers 26, 34, and 40 are all provided with pressure equalizing vent means 43 which may be provided with filtering means or other trap means to prevent atmospheric contamination of the ingredients of these receptacles.

To concentrate, enrich, and purify solids contained in dilute suspensions, the suspension to be treated is introduced into storage container 25. With stopcock 31 in position to close off container 26, pump 28 is activated to move the suspension from container 25 through line 27, Y connector 24, and inlet means 17 into front element 12 of filter assembly 11. As will be evident from FIGURE 3, the suspension follows a tortuous path in front filter element 12 from inlet 17 through subchambers 15 to outlet 18. Because of the repeated reversal of the direction of flow of the suspension within subchambers 15, eddies and turbulence are created in the liquid flow which prevent the suspended solids from adhering to and clogging filter 14. The liquid phase of the suspension is thus free to permeate without interference through filter 14 and perforations 20 and to enter interior collecting chamber 21 of rear filter element 13. With stopcock 32 in position to isolate container 34 and to interconnect outlet means 22 of interior chamber 21 with line 35, stopcock 36 is kept in open position so that collected filtrate flows from chamber 21 into filtrate collection container 33. The more concentrated suspension passes through outlet means 18 of front element 12 through line 39 and is returned to storage container 25 for further circulation.

To prevent solids from depositing on filter 14, despite the eddies produced in the flow of liquid in front element 12 by subchambers 15, it is absolutely necessary that the direction of pump 28 be continuously reversed to reverse the direction of flow of liquid through front element 12. This continuous reversal of flow direction is conveniently effected by automatic timing device 29 on reversible pump 28. Reversal of the flow of liquid through subchambers 15 between outlet means 18 and inlet means 17 again produces eddies in the flow path through chamber 12 as well as suction, by which the solids are largely flushed from filter 14. This continual change in flow direction together with the suction temporarily produced eliminates clogging of filter 14 so that filtration can proceed continuously.

For the quantitative recovery of solids, stopcock 32 is adjusted to isolate filtrate collection container 33 and to place container 34 and interior collecting chamber 21 of rear filter element 13 of filter assembly 11 into communication. At the same time, stopcock 31 is opened so that inlet means 17 of front filter element 12 and container 26 are in communication. A fluid, either a suspending agent in which the solids to be recovered are insoluble, or a solvent to dissolve the solids, is then moved, for example by pump means 38, from container 34 through line 37 into interior collecting chamber 21 of rear filter element 13, from whence it passes through filter 14 into the interconnecting subchambers 15 of front chamber 12. The solids, dislodged from, or dissolved out of filter 14 are then collected in container 26. Concentrated solids so collected can be washed, for example, by introducing them into container 25, together with a washing liquid such as distilled water from container 40, and then again concentrating the suspension of solids in wash liquid so formed. The process may be repeated as many times as desired.

When the solids in a suspension are to be concentrated, filter assembly 11 is advantageously mounted with filter 14 in an upright position. If solids are to be isolated as free as possible from liquid, such as protein precipitates for example, it is advantageous to mount filter assembly 11 so that filter 14 is in a horizontal position. In the latter process, the suspended solids are concentrated in the apparatus as described, pump 28 is then switched off, and the solids which are still in the connecting lines are collected on filter 14. By reducing the pressure in interior collecting chamber 21, using pump means 38, for example, most of the liquid still present in the solids is removed and the solids are isolated in interconnecting subchambers 15 of front element 12 in the form of a moist cake.

A further advantage of the present invention is that solids recovered from a suspension using the apparatus of the invention can be redissolved in the apparatus by introduction of a solvent into the system. In this embodiment, the solvent, introduced into storage container 25, for example from container 40, is circulated by pump means 28 through interconnecting subchambers 15 and lines 27 and 39, with stopcock 31 closed. As the solids dissolve in the solvent, the solution passes through filter 14 into interior collecting chamber 21, and then flows through outlet means 22 and stopcocks 32 and 36 into filtrate collection container 33. After collection in container 33, the dissolved substance can be further purified or can be isolated.

Because concentration, purification, and washing can be effected in a closed system using the apparatus of the present invention, the suspensions being treated are protected against contamination by impurities. This is of special importance for biological material which might otherwise become contaminated with bacteria. These solutions used for washing and suspending are preferably sterile solutions.

The process of the present invention can be employed with all suspensions of solids, and is of particular utility with suspensions of biological origin, such as suspensions of bacteria or other microorgansims, suspensions of cells, or protein precipitates. For example, the process can be used on an industrial scale to separate pertussis germs from the nutrient medium in which they are grown and to concentrate them to form stock suspensions which can then be diluted to any desired concentration of germs.

A better understanding of the present invention and of its many advantages will be had by referring to the following specific examples, given by way of illustration.

Example 1

60 liters of a suspension of inactivated pertussis germs having a mean germ density of $30(10^9)$ germs/ml. were enriched in the apparatus of the present invention, equipped with a membrane filter, washed with a physiological salt solution, and concentrated to a volume of about 500 ml. Forty hours were required for the operation. 3.5 liters of physiological salt solution were then passed from the interior collecting chamber of the apparatus through the filter to separate those germs adhering to the membrane. Four liters of concentrate were obtained which contained $480(10^9)$ germs/ml., substantially corresponding to a quantitative yield.

Example 2

Using the apparatus described herein, 60 liters of a staphylococcus suspension having a germ density of $830(10^6)$ germs/ml. were enriched, washed with 5–6 liters of physiological salt solution, and concentrated to a volume of 500 ml. 3.5 liters of physiological saline solution were passed in reverse through the filter element of the apparatus to separate the germs adhering to it. Four liters of concentrate having a germ concentration of $13,280(10^6)$ germs/ml. were obtained.

Example 3

A protein precipitate of human serum, prepared by precipitation with ammonium sulfate in a manner known in the prior art, was concentrated in the apparatus of the present invention provided with a hard filter. The solution was filtered with suction by a reduction of pressure in the interior collecting chamber of the rear element of the filter assembly until a moist cake formed. The residue was then redissolved with a solvent passed through the filter into collector chamber 21, collected in a container, and further purified. The filtrate was further fractionated by increasing its ammonium sulfate content, and the precipitates thus obtained were isolated in a similar manner using the apparatus of the invention.

What is claimed is:

1. Filtration apparatus for concentrating solids in a suspension comprising a solid phase and a liquid phase, said apparatus comprising a filter assembly having adjacent first and second shallow chamber means and a filter element therebetween, said first chamber means comprising a single continuous sinuous channel having first entrance and first exit means, said channel defining, with said filter element as a wall thereof, a sinuous flow path for said suspension between said first entrance and first exit means, said second chamber means defining a collection cavity for filtrate, said second chamber and cavity having said filter element as a wall thereof; first fluid container means for said suspension; conduit means communicating between said first container and said entrance and exit means of said sinuous channel in said first chamber means to define a continuous flow path for said suspension; and reversible pump means in said conduit means for periodically reversing the direction of flow of said suspension along said sinuous flow path to prevent the solid phase of the suspension from adhering to and clogging said filter element and to allow the liquid phase of the suspension to pass freely from said first chamber means through said filter element to said second chamber means.

2. In a process for filtering and concentrating solids in a suspension comprising a solid phase and a liquid phase by flowing said suspension, in contact with a filter element, through a single continuous sinuous channel with a direction of flow from a first end of said channel to a second end thereof, the improvement wherein said suspension is continuously recycled to flow through said sinuous channel and said direction of flow of said suspension in said sinuous channel between said first and second ends thereof is periodically reversed, whereby said liquid phase of said suspension is removed through said filter element without clogging of said filter element by said solid phase.

3. A process as in claim 2 wherein said suspension is continuously recycled through said channel until the liquid phase thereof has been substantially all removed through said filter element to leave said solid phase on said filter element.

References Cited
UNITED STATES PATENTS

| | | | |
|---|---|---|---|
| 1,302,813 | 5/1919 | Kuryla | 210—81 |
| 2,127,791 | 8/1938 | Stevens et al. | 210—321 |
| 2,364,366 | 12/1944 | Jahreis | 210—229 |
| 2,780,363 | 2/1957 | Pew | 210—82 |
| 2,737,300 | 3/1956 | Kracklauer | 210—409 X |
| 3,085,687 | 4/1963 | Erbach | 210—321 X |

SAMIH N. ZAHARNA, Primary Examiner

U.S. Cl. X.R.

210—195, 229, 258, 433